US012759514B2

(12) United States Patent
Dengg et al.

(10) Patent No.: US 12,759,514 B2
(45) Date of Patent: Oct. 13, 2026

(54) INTERFACE DEVICE

(71) Applicant: LIEBHERR-WERK BISCHOFSHOFEN GMBH, Bischofshofen (AT)

(72) Inventors: Reinhard Dengg, Tamsweg (AT); Gerald Heugenhauser, Goldegg (AT); Hans Knapp, Bischofshofen (AT); Robert Adler, Vienna (AT); Stephan Gruber, Vienna (AT); Christoph Nagl, Vienna (AT); Markus Rasch, Vienna (AT); Markus Stephan, Vienna (AT)

(73) Assignee: LIEBHERR-WERK BISCHOFSHOFEN GMBH, Bischofshofen (AT)

( * ) Notice: Subject to any disclaimer, the term of this patent is extended or adjusted under 35 U.S.C. 154(b) by 301 days.

(21) Appl. No.: 18/583,925

(22) Filed: Feb. 22, 2024

(65) Prior Publication Data

US 2024/0286586 A1 Aug. 29, 2024

(30) Foreign Application Priority Data

Feb. 24, 2023 (DE) ..................... 10 2023 104 600.4

(51) Int. Cl.
*B60S 5/02* (2006.01)
*B60W 10/18* (2012.01)

(52) U.S. Cl.
CPC ............ *B60S 5/02* (2013.01); *B60W 10/182* (2013.01)

(58) Field of Classification Search
CPC . B67D 2007/0403; B60W 10/182; B60S 5/02
See application file for complete search history.

(56) References Cited

U.S. PATENT DOCUMENTS 6,003,568 A * 12/1999 Strnad, Jr. .............. B60K 15/04 141/94
6,755,225 B1 6/2004 Niedwiecki et al.
(Continued)

FOREIGN PATENT DOCUMENTS

DE 10143159 C2 11/2003
DE 102016221783 A1 5/2018
(Continued)

OTHER PUBLICATIONS

Search Report issued in corresponding European Patent Application No. 23169945.5 dated Oct. 13, 2023 (8 pages).
(Continued)

*Primary Examiner* — Timothy L Maust
(74) *Attorney, Agent, or Firm* — Kilyk & Bowersox, P.L.L.C.

(57) ABSTRACT

The present invention relates to an interface device, which is or can be connected to a construction machine to be refueled, on the one hand, and to a preferably mobile hydrogen refueling station, on the other, or forms a component thereof, wherein the interface device has a drive unit or a power transducer designed to provide the drive power for transferring hydrogen from the hydrogen refueling station to the construction machine to be refueled and wherein the interface device is formed by the construction machine to be refueled and/or the preferably mobile hydrogen refueling station and/or a dispenser unit, which is designed to supply the preferably mobile hydrogen refueling station and/or the construction machine with the drive power.

13 Claims, 3 Drawing Sheets

(56) References Cited

U.S. PATENT DOCUMENTS

Figure 1:
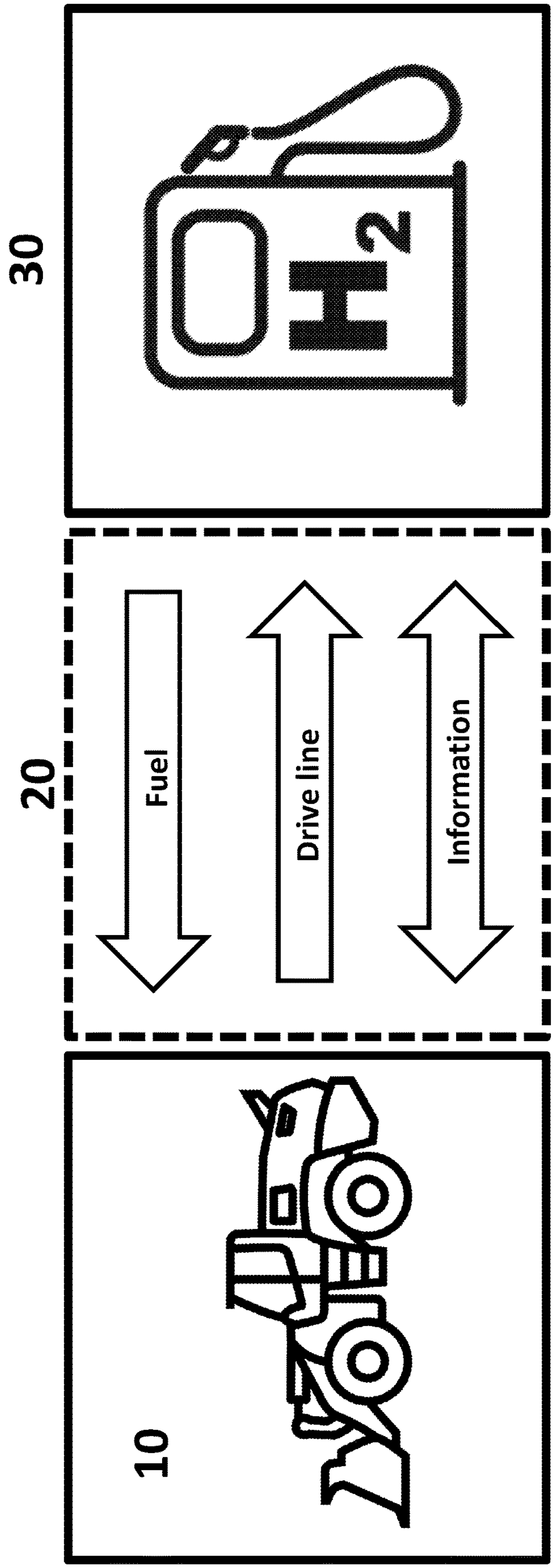

| | | | | |
|---|---|---|---|---|
| 9,725,295 | B2 * | 8/2017 | McKay | B67D 7/362 |
| 9,815,683 | B1 * | 11/2017 | Kalala | B67D 7/3218 |
| 9,828,050 | B2 | 11/2017 | Hindle | |
| 10,263,428 | B2 * | 4/2019 | Nishigai | H02J 1/082 |
| 2013/0240080 | A1 | 9/2013 | Pick et al. | |

FOREIGN PATENT DOCUMENTS

| | | | |
|---|---|---|---|
| DE | 102020113803 | A1 | 11/2020 |
| DE | 102020107337 | A1 | 9/2021 |
| DE | 102021203705 | A1 | 10/2022 |
| DE | 102021204365 | A1 | 11/2022 |
| EP | 0125320 | B1 | 11/1984 |
| WO | 2010038069 | A2 | 4/2010 |
| WO | 2022073960 | A1 | 4/2022 |
| WO | 2023282764 | A1 | 1/2023 |

OTHER PUBLICATIONS

Search Report issued in corresponding German Patent Application No. 10 2023 104 600.4 dated Jan. 30, 2024 (16 pages).

"Hydrogen refuelling station," Wikipedia, https://de.wikipedia.org/w/index.php?title=Wasserstofftankstelle&oldid=230981645, Feb. 17, 2023 (with English translation) (30 pages).

* cited by examiner

INTERFACE DEVICE

The present application claims priority to German Patent Application No. 10 2023 104 600.4, filed Feb. 24, 2023, which is incorporated in its entirety by reference herein.

The present invention relates to an interface device, which is designed to refuel a vehicle, in particular a construction machine, with hydrogen from a preferably mobile refueling station.

Large construction machines are sometimes operated in a stationary position and away from the energy and refueling infrastructure in material extraction.

Unlike wheeled vehicles such as wheel loaders or dumper trucks, for which it is possible to drive to a stationary refueling station, large construction machines such as tracked vehicles, e.g. crawler excavators or bulldozers, are severely restricted in their operating range. It is therefore common practice to supply these machines with fuel, preferably from a mobile refueling station, which today is usually diesel fuel that is transported in a suitable container from a refueling station to the construction machines in compliance with dangerous goods transport regulations.

The energy requirement for pumping the diesel fuel from the preferably mobile refueling station, i.e. from the preferably mobile transport container into the construction machinery tank, is comparatively low and is usually provided either by a separate battery or the battery of the transport vehicle for the diesel fuel. Alternatively, the construction machine to be refueled can have an external refueling pump in order to suction the diesel fuel out of the transport container delivered by the transport vehicle.

The situation is much more difficult if the fuel is not diesel fuel, but hydrogen, such as compressed hydrogen.

On the one hand, when refueling a construction machine powered by compressed hydrogen, the power and energy requirements are significantly higher than for a diesel refueling station in order to feed the fuel into the vehicle tank via a preferably mobile hydrogen refueling station. On the other hand, another complicating factor is that there is usually no energy supply network at the locations of the stationary construction machine to drive the hydrogen refueling station or its compressor with electrical power, for example, and to cool the compressed hydrogen.

The usual, preferably mobile refueling solution available today for hydrogen-powered vehicles consists of simply overflowing hydrogen, in which compressed hydrogen that has already been compressed elsewhere is fed from a transport container into the vehicle tanks of the stationary construction machine with low local energy requirements until the pressure between the transport container and the vehicle tank is equalized. This solution is characterized by low delivery quantities and low filling levels on the vehicle side, which reduces the range. The overflow solution is therefore generally well suited for test purposes and trial operation, but not as a solution suitable for series production for energy-intensive construction machinery applications.

The object of the present invention is therefore to provide a refueling solution for construction machinery that can also be used to fill stationary construction machinery or construction machinery with an operating range that is severely restricted with a sufficient amount of hydrogen from a preferably mobile hydrogen refueling station.

The object is provided by an interface device, which is or can be connected to the construction machine to be refueled, on the one hand, and to the preferably mobile hydrogen refueling station, on the other, or forms a component thereof, wherein the interface device has a drive unit or a power transducer designed to provide the drive power for transferring hydrogen from the hydrogen refueling station to the construction machine to be refueled and wherein the interface device is formed by the construction machine to be refueled and/or the preferably mobile hydrogen refueling station and/or a dispenser unit, in particular a dispenser vehicle, which is designed to supply the preferably mobile hydrogen refueling station and/or the construction machine with the drive power.

The hydrogen refueling station is preferably mobile and can be a vehicle with one or more hydrogen tanks, for example. However, the invention also comprises a stationary hydrogen refueling station.

The interface device can be formed by the vehicle or construction machine to be refueled, by the refueling station, by both or by parts of both. It is also possible that it is not formed by the vehicle to be refueled or the construction machine or a part thereof, but by an external unit, which is preferably designed as a vehicle.

The drive power can, for example, be electrical, hydraulic, pneumatic or mechanical power or a combination of two or more of these types of power.

The drive unit can be designed to provide the drive power by means of hydraulic power, electrical power, pneumatic power or mechanical power. It is also conceivable that a power transducer is provided that absorbs energy from an external energy source, such as an electricity grid, and then provides this power for hydrogen transfer after a transformation to a different voltage level, if necessary.

The present invention of a refueling interface solves the problem of the problem of the above-mentioned power supply shortfall for a preferably mobile hydrogen refueling station at remote locations by providing the energy supply for the preferably mobile hydrogen refueling station not through a locally available large power connection, but through a vehicle or a construction machine, wherein the vehicle can be the vehicle to be refueled and/or can be the transport vehicle with the hydrogen transport container(s) and/or can be a dispenser vehicle that drives the preferably mobile hydrogen refueling station, so that the successive refueling of several vehicles at a time can also be carried out significantly faster.

The drive power of the interface device, which is provided by one of the vehicles or units described above, can be provided or generated by means of hydraulic power, e.g. provided by a separate hydraulic oil circuit or vehicle hydraulics and refueling share a common oil circuit.

Instead of and in addition to hydraulic power, electric power can also be used if the vehicle has larger electric drives (e.g. a fuel cell vehicle), e.g. through high-voltage drives.

Instead of and in addition to the two above-mentioned power sources, pneumatic and/or mechanical power generation can also be considered.

Alternatively, the drive power for the preferably mobile refueling station can also come from another power source, e.g. the electricity grid.

In one embodiment, the interface device can be designed to provide the control power required to control the refueling process. This can be control power in the form of electrical power in the low-voltage range, typically 12V, 24V or even 48V, for the operation of the refueling station control system. This can, for example, be provided by the low-voltage electrical system of one of the above-mentioned vehicles, possibly with a DC/DC converter on the refueling station side, or in the case of the variant with electric drive power from the high-voltage supply with a DC/DC converter on the refueling station side.

In a further advantageous embodiment, the interface device has a transmission device for transmitting information (with high control quality) between the preferably mobile refueling station and the vehicle to be refueled, but also to or from the separate vehicle providing the drive power, if present:

This transmission device can have means for contactless data transmission in both directions (e.g. NFC interface). However, data communication by means of cables and connectors, etc. is also an option.

In a further embodiment, the interface device includes one or more components for ensuring basic safety requirements, such as one or more of the following:

- Earthing/potential equalization
- Lightning protection
- Pilot contacts, especially in the case of electrical power supply
- Interlocking devices with corresponding protective devices In a preferred embodiment of the invention, the interface device is designed to transfer the hydrogen between the preferably mobile refueling station and the vehicle or construction machine in the form of compressed hydrogen.

It is also conceivable to collect the reaction water via the interface between the preferably mobile refueling station and the vehicle providing the drive power and feed it to a collection container if the vehicle providing the drive power is a fuel cell vehicle.

For refueling very large machines with filling quantities of more than 50 kg of compressed hydrogen, it can be advantageous to refuel the hydrogen tanks of the construction machine via several preferably mobile refueling stations in parallel. The interface can therefore be designed to fill the hydrogen tank(s) of the vehicle to be refueled simultaneously by operating several hydrogen refueling stations in parallel, for which purpose the interface has corresponding inlet and outlet connections.

Means for automatically activating the parking brake can be provided, which automatically activates the parking brake on the vehicles when the vehicles to be refueled and the preferably mobile hydrogen refueling station are connected via the refueling interface, in order to prevent the vehicles from moving off unintentionally.

The present invention also relates to a system comprising an interface device according to the present invention and one or more associated vehicles to be refueled and/or preferably mobile hydrogen refueling stations.

The term "construction machine" comprises any stationary or mobile working machine, such as earthmovers, crawlers, excavators, etc.

The term "connected" means that the interface device is in any case suitable for transferring hydrogen from the preferably mobile hydrogen refueling station(s) to the construction machine(s) and, if necessary, additionally providing the electrical control power for the refueling process and/or providing the data communication between one or more of the communication partner interface devices, preferably the mobile refueling station and construction machine to be refueled.

The interface device can be completely or partially a component of the vehicle to be refueled and/or the preferably mobile refueling station and/or a separate device, in particular a separate vehicle.

At this point it is pointed out that the terms "a" and "one" do not necessarily refer to exactly one of the elements, although this is a possible embodiment, but can also denote a plurality of the elements. Similarly, the use of the plural also includes the presence of the element in question in the singular and, conversely, the singular also includes several of the elements in question. Furthermore, all of the features of the invention described herein may be claimed in any combination or in isolation from each other.

Figure 2:
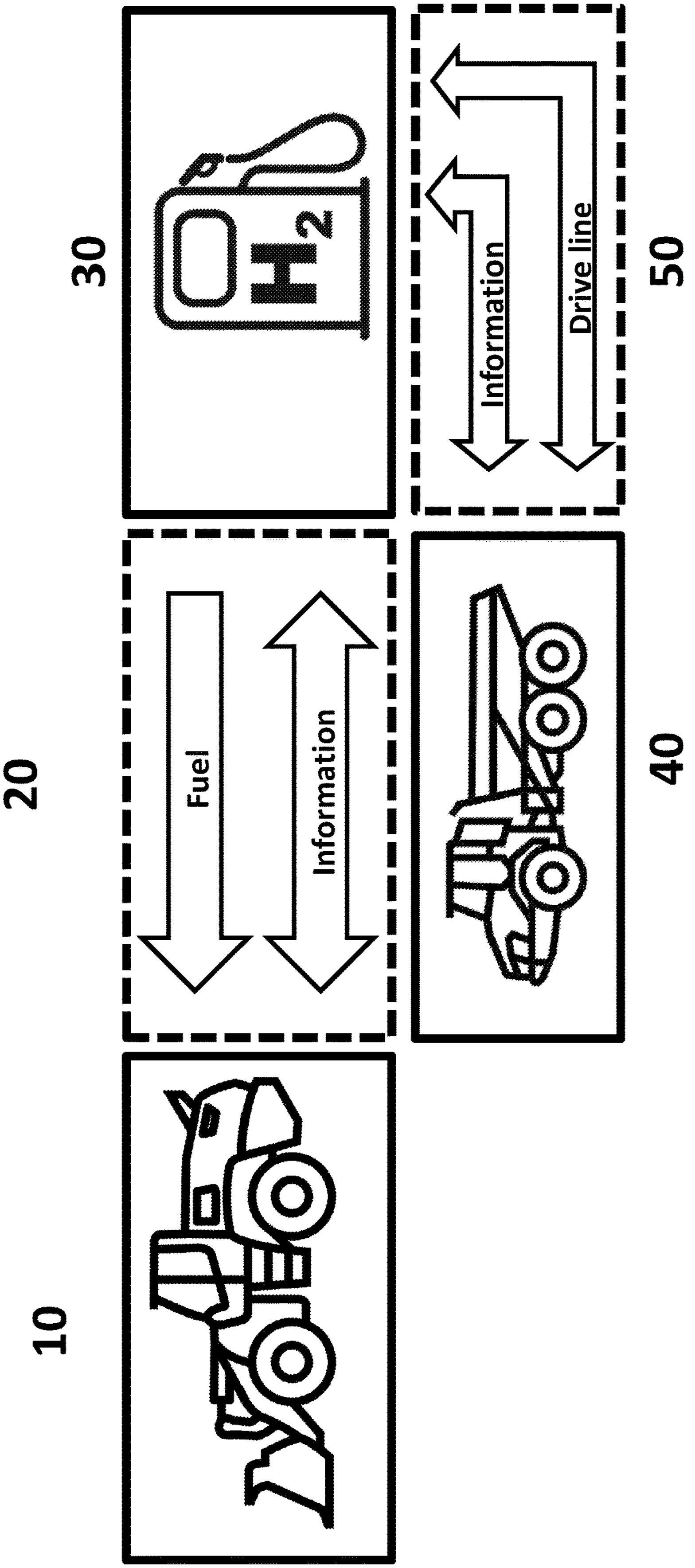
Figure 3:
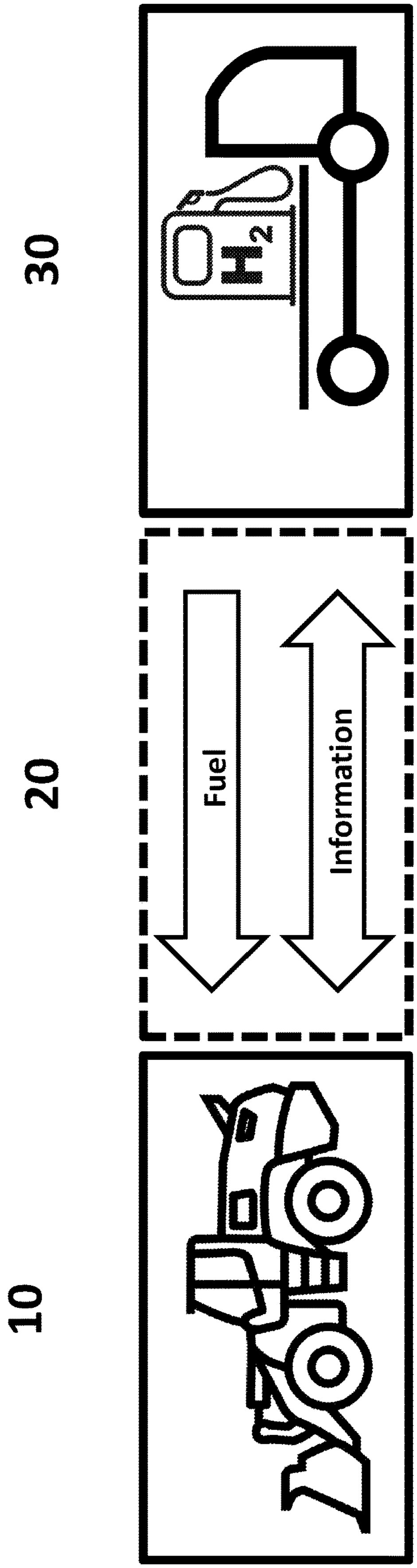

Further advantages, features and effects of the present invention are shown in the following description of preferred exemplary embodiments with reference to the figures, in which the same or similar components are designated by the same reference numerals. In the figures:

FIG. 1: shows a schematic view of an embodiment of an arrangement according to the invention in which the vehicle to be refueled drives the preferably mobile refueling station, FIG. 2: shows a schematic view of an embodiment of an arrangement according to the invention in which a separate vehicle drives the preferably mobile refueling station and FIG. 3: shows a schematic view of an embodiment of an arrangement according to the invention in which the transport vehicle for hydrogen drives the preferably mobile refueling station.

In the figures, the reference numeral 10 denotes the construction machine to be refueled, e.g. a crawler excavator, 20 denotes the interface device, and 30 denotes the refueling station from which the hydrogen is to be transferred to the construction machine to be refueled.

As can be seen from the exemplary embodiment in FIG. 1, in this example the drive power, e.g. electrical power for operating a feed pump or a compressor for hydrogen, is provided by the vehicle 10 to be refueled, which thus drives the refueling station 30.

The fuel (hydrogen) is then transferred from the refueling station 30 to a suitable tank of the vehicle 10.

The interface device 20 is also used for bidirectional communication between the vehicle 10 and the refueling station 30, so that, for example, the fill level of the tank in the vehicle 10 can be reported, so that the refueling process is terminated when the tank is sufficiently full.

In the exemplary embodiment in FIG. 2, the transfer of hydrogen and the communication correspond to the exemplary embodiment in FIG. 1 with an interface 20 between the vehicle 10 and the refueling station 30.

However, in FIG. 2, the drive power is provided by an external vehicle or drive vehicle 40. Between this vehicle and the refueling station, there is a second interface device 50 between the drive vehicle 40 and the refueling station 30, which allows information to be exchanged between the drive vehicle 40 and the refueling station 30.

FIG. 3 shows an example in which the drive means for the transfer of hydrogen are arranged in the mobile refueling station, i.e. this drives the refueling station. The refueling station 30 is connected to or located on a transport vehicle.

The transfer of hydrogen and the data exchange correspond to the exemplary embodiment in FIG. 1.

At this point, it should be noted that the term "refueling station" covers any system, such as a container, a container vehicle, etc., in which hydrogen is present in any aggregate state.

Preferred, but not limiting, embodiments of the invention are described below:

Interface device between vehicles and the hydrogen refueling stations for refueling construction machinery, which is particularly suitable for operation in remote locations without a connection to a power supply network, by providing the drive power for the preferably mobile refueling station via the interface device by a vehicle or a construction machine in the form of hydraulic power or electrical power or pneumatic power or mechanical power, wherein the vehicle providing the drive power is the vehicle to be refueled itself, or the transport vehicle delivering the hydrogen, or another dispenser vehicle for propulsion power.

Interface device between vehicles and the hydrogen refueling stations, wherein hydraulic connections are provided and/or electrical connections are provided and/or pneumatic connections are provided for the purpose of power transmission on the vehicle side and refueling station side.

Interface device between vehicles and the hydrogen refueling stations for the transfer of electrical control power for the power supply of the refueling station's low-voltage network with a mechanical contact.

Interface device between the vehicle to be refueled and the hydrogen refueling station for the transmission of information via a contactless interface device.

Interface device between the vehicle providing the drive power and the hydrogen refueling station for the bidirectional transmission of information via a contactless interface device.

Interface device between vehicles and the hydrogen refueling station, wherein a cable connection with mechanical contacting can also be used instead of contactless data transmission.

Interface between vehicles and the hydrogen refueling station, wherein these are suitable for transmitting data in both directions with high control quality in order to be able to use this data for safety functions on the vehicle and/or refueling station side.

Interface device between vehicles and the hydrogen refueling station, wherein the interface device allows the connection of vehicles and the refueling station for earthing and/or potential equalization and/or lightning protection and has mechanical contacting.

Interface device between vehicles and the hydrogen refueling station, which has pilot contacts and/or, in the case of electrical drive power, interlock contacts by means of mechanical contacting.

Interface device between vehicles and the hydrogen refueling station, which has a suitable manually actuated and/or automatically actuated locking system.

Interface device between vehicles and the hydrogen refueling station, which have hydraulic and/or electric and/or pneumatic quick couplings and are controlled by the vehicles and/or the hydrogen refueling station.

Interface device between vehicles and the hydrogen refueling station, which allows the simultaneously filling of the hydrogen container of the vehicle to be refueled by operating a plurality of hydrogen refueling stations in parallel.

Control(s) on the vehicle side, which automatically trigger the activation of the parking brake when the interface device is connected, wherein the vehicles can be the vehicle to be refueled and/or the transport vehicle and/or the dispenser vehicle.

Interface device between vehicles and the hydrogen refueling station, in particular suitable for refueling construction machinery, trucks and preferably mobile equipment away from stationary refueling stations, temporary refueling stations and far from an energy supply network for powering conventional, preferably mobile, hydrogen refueling stations.

Interface device between vehicles and the hydrogen refueling station, wherein the vehicles to be refueled have a fuel cell drive or a hydrogen piston motor.

Interface device between a fuel cell vehicle providing the drive power and a hydrogen refueling station designed in such a way that the reaction water of the fuel cell drive is collected via the interface device and fed to a collection tank.

The invention claimed is:

1. An interface device comprising a drive unit configured to provide drive power via hydraulic power or mechanical power for transferring hydrogen from a hydrogen refueling station to a construction machine to be refueled, wherein the interface device is formed by the construction machine to be refueled, wherein the interface device is configured to connect to the hydrogen refueling station, wherein the interface device is configured to connect to the construction machine, or a dispenser unit or vehicle, wherein the interface device is configured to connect to the construction machine and the hydrogen refueling station, and is further configured to supply the hydrogen refueling station and/or the construction machine with the drive power.

2. The interface device according to claim 1, wherein the interface device is configured to provide electrical control power for a power supply of a power grid of the hydrogen refueling station.

3. The interface device according to claim 1, wherein the interface device is configured for transmitting data from and/or between the construction machine and/or the hydrogen refueling station.

4. The interface device according to claim 1, wherein the interface device has one or more components for ensuring safety requirements when transferring the hydrogen from the hydrogen refueling station to the construction machine to be refueled.

5. The interface device according to claim 1, wherein the interface device is configured to transfer the hydrogen between the hydrogen refueling station and the construction machine in a form of compressed hydrogen.

6. The interface device according to claim 1, wherein the interface device is configured to simultaneously fill one more or hydrogen containers of the construction machine to be refueled by operating a plurality of hydrogen refueling stations in parallel.

7. The interface device according to claim 1, wherein the interface device has a manually actuated and/or automatically actuated locking mechanism.

8. The interface device according to claim 1, wherein the interface device is configured to automatically activate a parking brake of a vehicle connected to the interface device in order to be able to prevent the vehicle from moving off unintentionally.

9. The interface device of claim 1, wherein the interface device is formed by the hydrogen refueling station, wherein the interface device is connected to the construction machine, or the dispenser unit or vehicle, wherein the interface device is connected to the construction machine and the hydrogen refueling station.

10. The interface device according to claim 1, wherein the interface device has a manually actuated and/or automatically actuated locking mechanism via hydraulic and/or electric and/or pneumatic quick-release couplings for connecting two hydrogen-carrying elements.

11. A system comprising the interface device according to claim 1 and one or more associated vehicles to be refueled and one or more hydrogen refueling stations.

12. The interface device according to claim 1, wherein the hydrogen refueling station is a mobile hydrogen refueling station.

13. The system according to claim 11, wherein the one or more hydrogen refueling stations comprises one or more mobile hydrogen refueling stations.

* * * * *